June 21, 1960  D. J. KLEE  2,942,047
CURRENT COLLECTOR FOR AN ELECTRIC ARC FURNACE
Filed March 30, 1959  2 Sheets-Sheet 1

INVENTOR.
David J. Klee
BY *M W Goodwin*

His Attorney

June 21, 1960 D. J. KLEE 2,942,047
CURRENT COLLECTOR FOR AN ELECTRIC ARC FURNACE
Filed March 30, 1959 2 Sheets-Sheet 2

INVENTOR.
David J. Klee
BY M W Goodwin

His Attorney

United States Patent Office 2,942,047
Patented June 21, 1960

2,942,047
CURRENT COLLECTOR FOR AN ELECTRIC ARC FURNACE

David J. Klee, Shelbyville, Ind., assignor to General Electric Company, a corporation of New York Filed Mar. 30, 1959, Ser. No. 802,785

5 Claims. (Cl. 13—14)

This invention relates to electric arc furnaces and, more particularly, to a novel and improved current collector particularly adapted for use with an electric arc furnace of the consumable electrode type.

Electric arc furnaces of the consumable electrode type generally comprise a crucible and an electrode housing aligned with the crucible and containing an electrode supported for movement relative to the housing and crucible. The furnace is operated by striking an arc between the electrode and the bottom of the crucible, whereby the arc will consume the electrode which is fabricated from the material which it is desired to melt. It is, of course, necessary to provide some means for providing electric current to the electrode as it is advanced during the melting operation. The problems encountered in providing a high ampere connection to a moving electrode contained within a housing will, of course, be obvious; and these problems are further complicated in a so-called vacuum arc melting furnace wherein the interior of the electrode housing and crucible is evacuated or at least is under a pressure substantially less than atmospheric.

Heretofore, various means have been utilized to connect the electrode of an electric arc furnace of the consumable electrode type. One such means is generally referred to as a stinger type arrangement, wherein the electrode is carried by an elongated member extending outwardly through the end of the electrode housing opposite the crucible with long flexible leads connecting the stinger to a source of electrical power. This stinger, which may be water cooled, necessitates the use of a sliding vacuum seal where the stinger extends through the electrode housing. Inasmuch as the stinger must, when the electrode is in a starting position, extend beyond the housing a distance at least equal to the normal electrode advance, the headroom requirement of the furnace is often much greater than might be desired. These disadvantages together with other obvious disadvantages of increased manufacturing tolerances and cost have made it desirable to find other means for supporting the electrode within the housing and also for connecting the electrode to an external source of power.

A novel means for supporting the electrode within the electrode housing as well as for connecting the electrode to a source of external power is described and claimed in copending application Serial No. 718,071, filed February 27, 1958, in the name of Richard E. Lyman, the assignee of that application being also the assignee of this application. The furnace of this aforementioned copending application eliminates the disadvantages of the stinger type furnace by movably supporting an electrode support entirely within an elongated hollow metal member and providing contact means on the support slidably engaging the inner wall of the hollow member. The hollow member is connected to a source of electrical power to provide a current path through the hollow member to the contacts and through the support to the electrode. However, it has been found to be desirable to reduce the heating due to $I^2R$ losses of the specific current collector shown in the aforementioned copending application while at the same time maintaining a relatively low contact voltage drop and at the same time providing a simpler and less costly device which will permit relatively large tolerances and surface imperfection on the inner wall of the hollow metal member forming the electrode housing.

It is the object of this invention to provide a novel and improved current collector of a type adapted to be mounted for movement with an electrode support disposed entirely within an electrode housing, with the current collector having means resiliently slidably engaging the inner wall of the housing in electrical contact and which will provide relatively low contact voltage drop, reduced $I^2R$ losses, high current carrying capacity, long service life, and which will be of simpler and more economical construction. Other objects and advantages will be in part obvious and in part pointed out in detail hereinafter.

The advantages and more specific details of this structure will be apparent from a consideration of the following detailed description taken in connection with the accompanying drawings, in which.

Figures 1, 3:
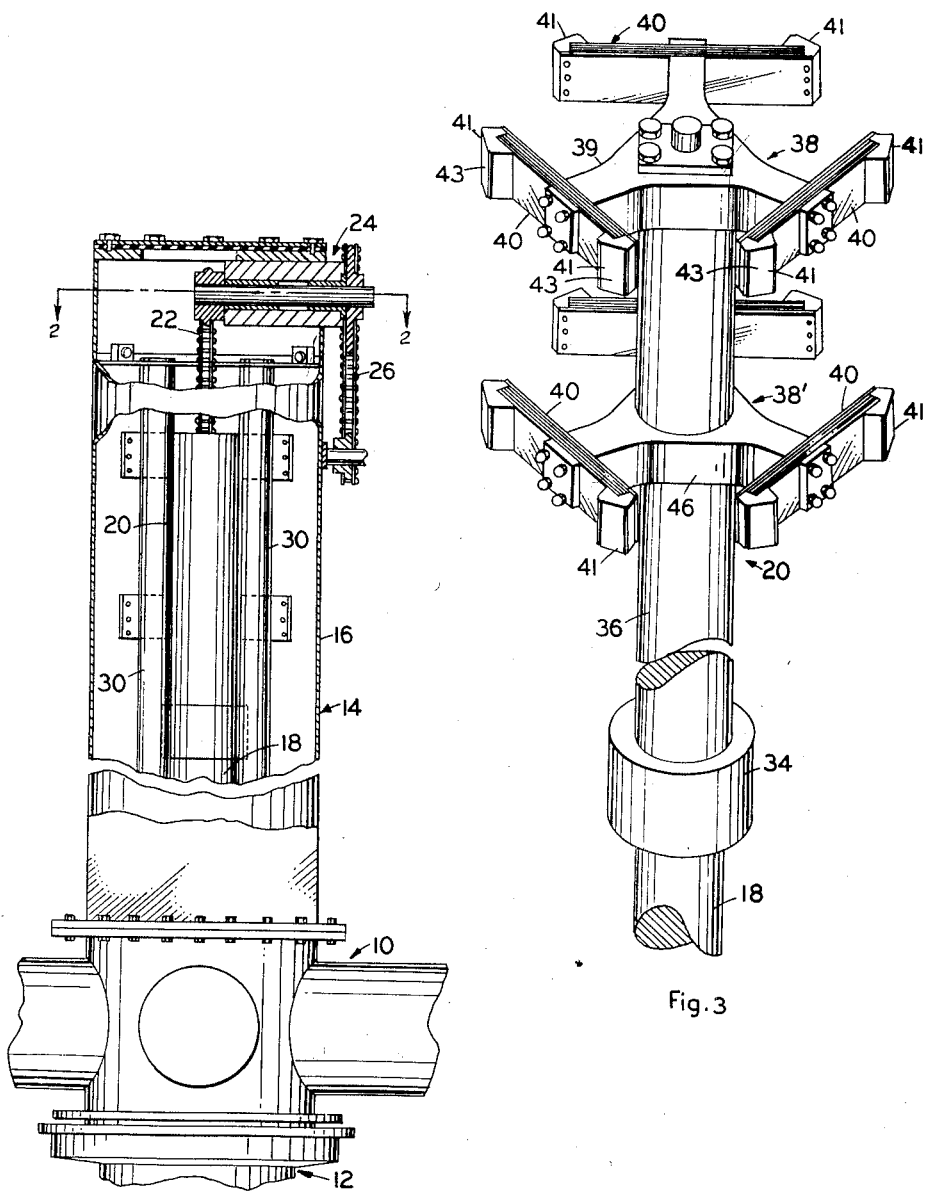
Fig. 1 is a fragmentary elevational view, partly in section, of an exemplary electric arc furnace incorporating a current collector of this invention.
Fig. 3 is an enlarged perspective view of the current collector of the furnace of Fig. 1.

With reference to the drawings and particularly Fig. 1, an electric arc furnace of a type with which this invention is generally concerned comprises a furnace body portion 10 from which depends a crucible 12 for containing the metal melted during furnace operation. The body is adapted to be supported on a structural frame (not shown). Bolted to the top of the body 10 and extending upwardly therefrom in alignment with the crucible 12 is an electrode housing 14 comprising an elongated hollow metal member in the form of a cylinder 16. A consumable electrode 18 is suspended vertically within the cylinder 16 by means of a current collector and electrode supporting assembly 20 suspended from a chain 22 engaged about a sprocket drive 24 extending outwardly of the cylinder 16 and adapted to be driven by a chain drive 26 connected to suitable drive means, such as the electric motor drive 28 shown in Fig. 2 supported by the electrode housing. As most clearly seen in Fig. 2, a plurality of electrode guide posts 30 are angularly spaced about the axis of the cylinder 16 and extend longitudinally thereof in sliding engagement with the assembly 20 to guide the electrode in its advance relative to the electrode housing. Also, as most clearly seen in Fig. 2, a plurality of elongated channels 32 are mounted externally of the electrode housing and extend longitudinally thereof. These channels, through which cooling water may be circulated, provide means to cool the outer wall of the electrode housing.

Figure 2:
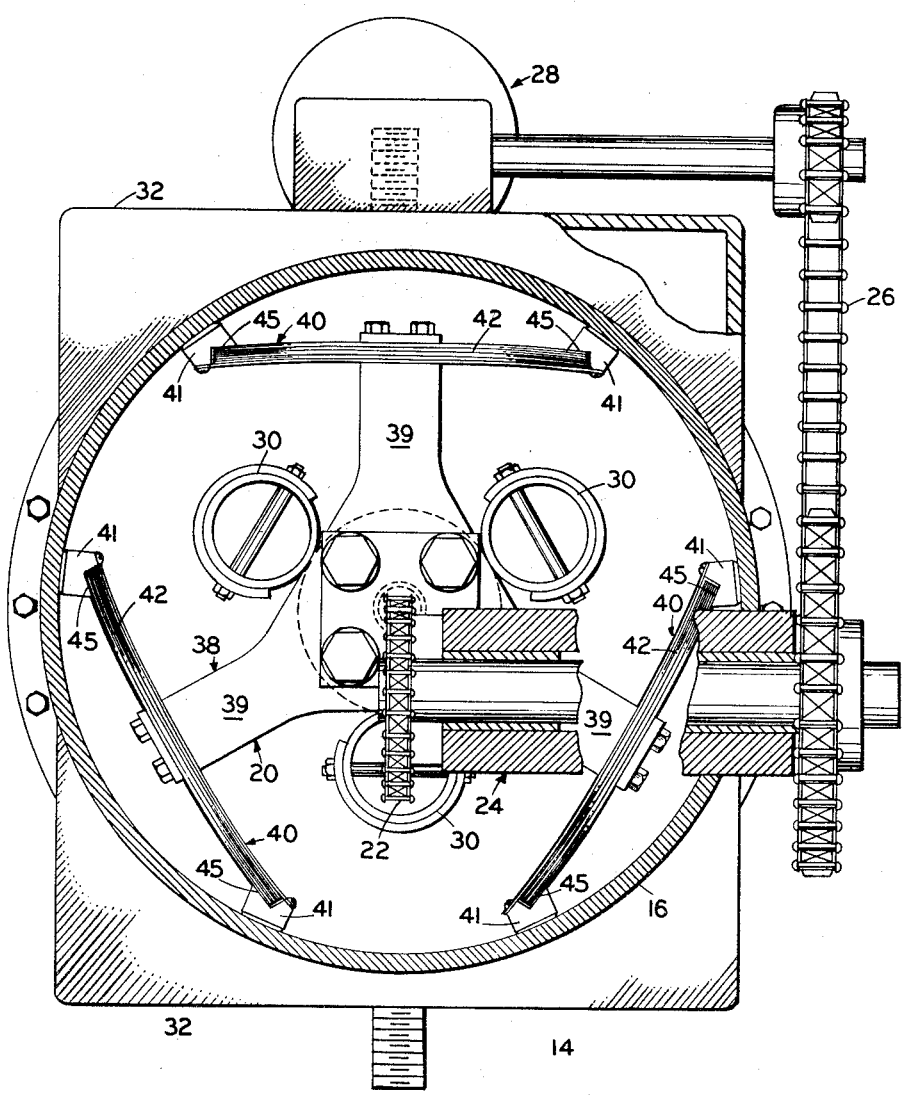
Fig. 2 is an enlarged cross sectional view substantially along the line 2—2 of Fig. 1.

With particular reference to Figs. 2 and 3, the current collector and electrode support assembly 20 comprises an electrode supporting clamp or other suitable device 34 for engaging the upper end of the electrode. The clamp 34 may be of any desired configuration suitable for supporting the electrode in depending relation and for providing an electrical connection between the electrode and a center post or support member 36, the lower end of which carries the electrode clamp 34. The current collector portion of the assembly 20 comprises a three-armed spider 38 bolted to the top end of the supporting member 36 and comprising a plurality of arms 39 extending radially outwardly of the post 36. A set of resilient leaf-type conductors 40 is secured to the outer ends of each of the spider arms 39 in electrical connection with the spider arms. Specifically, each set 40 of the conductors comprises a plurality of stacked, resilient, metal, generally rectangular, flat members 42 extending at right angles to the spider arms and thus to a radius of the supporting member 36 and cylinder 16. The leaves 42 of each set 40 thereof are not secured to each other but are merely secured in stacked overlying engagement by the bolts mounting the leaves on a spider arm so that the leaves extend in opposite directions in cantilever fashion. Thus, the leaves are each permitted to slidably move relative to next adjacent leaves during flexure of the outer ends of the leaves radially of the electrode support. A shoe or contact member 41 is disposed at each of the opposite ends of each set of leaves and is fixed to the radially innermost leaf only of the set of leaves. Each shoe provides a relatively large area contact surface 43 wipingly engageable with the inner wall of the cylinder 16 in electrical contact therewith. Each shoe further has a shoulder 45 extending generally parallel to the leaves 42 and disposed in overlying engageable relation to the end portion radially outermost conductor leaf 42. The ends or tips of the leaves 42, with the exception of the leaf mounting the shoe 41, are preferably spaced from the shoe when the leaves are in unflexed condition to assure that there is no binding between the leaf ends and shoe during flexing of the leaves. The leaves 42 may be fabricated of any suitable resilient electrically conductive metal, such as beryllium copper alloy or a stainless steel.

As will be apparent from Fig. 3, in the specific embodiment shown, a second group of sets 40 of leaf type conductors and associated contacts or shoes 41 are disposed below the sets previously described and are supported by a spider 38' generally similar to the spider 38 previously described, with the exception that the center portion of the spider 38' comprises a collar-like member 46 which encircles and is fixedly secured to supporting member 36. The purpose and advantage of the second group of sets of conductors 40 and shoes 41 will be fully apparent hereinafter.

In the operation of a furnace utilizing a current collector of the present invention, external power connections are made to the electrode housing 14 and crucible 12 by suitable means (not shown). The current introduced into the electrode housing, or in other words the cylinder 16, passes through the wall of the cylinder 16 to the shoes 41 through the spider 38 to the central supporting member 36 and thence through the electrode clamp 34 to the electrode 18. A quantity of scrap metal is normally disposed in the bottom of the crucible 12, whereby it is electrically connected to the crucible power source, and thus an arc may be struck between the lower end of the electrode and the quantity of starting material in the bottom of the crucible. The heat from this arc will melt the material of the electrode, the melted material being deposited in the crucible. As will be apparent, the current connection between the shoes 41 and the electrode may be other than as specifically shown, although this particular structure has the advantage of utilizing common parts for structural members as well as for electrical conductors, thus providing a simpler and more economical structure than if separate components were used for these features.

The faces of the shoes 41 resiliently slidably engage the inside of the cylinder 16, as most clearly shown in Fig. 2. Inasmuch as the leaves 40 mounting the shoes are resiliently flexible, they will ride over any imperfection or out-of-roundness in the inner wall of the cylinder 16 as the current collector is moved relative to the housing during the melting operation. Thus, these contacts may be designed to accommodate a normal deviation or tolerance of standard commercial piping and make it possible to fabricate the electrode housing from such a piece of pipe with no machining operations required on the inner wall of the pipe other than possibly rust removal.

As will be seen from Fig. 2, a relatively wide area contact is made on the electrode housing inner wall or surface by each shoe 41, thus assuring a good electrical contact along the inner wall of the cylinder. The shoes or contact blocks 41 are fabricated preferably of copper. The springs or leaves 42 are preferably fabricated of stainless steel in order to assure the desired spring characteristics at operating temperatures as high as 800° F., and the leaves are preferably copper plated to provide uniform current distribution through each leaf. The heat generated in the leaves is radiated to the water cooled electrode housing, thus eliminating any special requirements for cooling of the leaves. While the thickness or cross sectional area of each set of leaves is selected to be sufficiently great so as to provide for the conduction of the high amperage load to the shoes, it is preferable to use a relatively large number of thin leaves for each set in order to obtain the flexibility desired to permit large tolerances in the inner dimensions of as well as surface imperfections on the inner wall of the cylinder 16. The current collector of this invention has a particular advantage in that a plurality of groups of sets of conductors 40 and shoes 41 may be easily stacked in vertical array as shown in Fig. 3 in order to provide higher current carrying capacity. Additionally, it should be noted that the current collector portion of this invention is not limited to use within a consumable electrode arc furnace but will also find utility in those furnaces of the nonconsumable electrode type where it is necessary or desirable to move the electrode relative to the electrode housing. This latter advantage is particularly apparent in furnaces such as of the general type disclosed herein which are adapted for use with either consumable or non-consumable electrodes.

The combination of the wide contact area copper shoes, together with a relatively low biasing force on the shoes provides a service life for the current collector which is superior to previous structures. The low biasing force on the shoes is obtained by the use of a plurality of leaf conductors each of relatively low spring force whereby the total spring force is still fairly low. As an example, in a specific embodiment similar to that shown in the accompanying drawings and which was rated for 9,000 amperes, twenty-three leaves were used in each set thereof in order to maintain the low resilient force desired while providing the high amperage conduction and good electrical connection necessary for the devices. The low spring force additionally eliminates any tendency for the assembly to bind in the housing and assures that the electrode and associated support may be fed by a controlled gravity feed. Lastly, the easy maintenance and simple manufacture and assembly of the current collector of this invention contributes to a material reduction in expense of manufacture and operation of the over-all furnace.

While the invention has been described in terms of the specific embodiment shown as well as in terms of a specific furnace application, it is, of course, to be understood that the foregoing description and drawings are merely exemplary in nature; and it is intended that the invention is to be limited only by the appended claims, which shall include within their scope all structure which logically falls within the language of these claims.

What I claim as new and desire to secure by Letters Patent of the United States is:

1. In an electric arc furnace of the type having an electrode housing and a crucible aligned therewith with the electrode housing including an elongated cylindrical metal member having means for the connection thereof to a source of electrical power; means for movably supporting an electrode in said cylindrical member with said electrode extending longitudinally of said cylindrical member, means for moving the electrode supporting means longitudinally of said cylindrical member, and means for providing an electrical connection between said cylindrical member and an electrode carried by said supporting means comprising an electrical conductor including a set of resilient metal members arranged in stacked overlying engagement and extending generally chordally of and within said cylindrical member, means mounting the leaves in cantilever fashion for movement with the electrode supporting means and for flexure generally radially of the cylindrical member and with the unsupported portions of each metal member being in sliding contact with next adjacent metal members during simultaneous flexure of the metal members, and a contact member engageable in sliding contact with the inner surface of said cylindrical member and carried by the set of metal members for movement therewith and having means engageable with a free end portion of the radially outermost member in the set during movement of the contact radially inwardly of the cylindrical member.

2. In an electric arc furnace of the type having an electrode housing and a crucible aligned therewith with the electrode housing including an elongated cylindrical metal member having means for the connection thereof to a source of electrical power; means for movably supporting an electrode in said cylindrical member with said electrode extending longitudinally of said cylindrical member, means for moving the electrode supporting means longitudinally of said cylindrical member, and means for providing an electrical connection between said cylindrical member and an electrode carried by said supporting means comprising an electrical conductor including a set of resilient metal plate-like members in stacked overlying engagement and extending generally chordally of and within said cylindrical member, means mounting the plate-like members on the electrode supporting means for movement therewith and with the plate-like members extending in opposite directions in cantilever fashion and with the unsupported portions of the plate-like members being in sliding contact with next adjacent plate-like members during simultaneous flexure thereof, and a contact member slidably engageable with the inner surface of the cylindrical member mounted adjacent each of the free ends of the set of plate-like members for movement therewith and having means engageable with the radially outermost plate-like member during movement of the contact member radially inwardly of the cylindrical member.

3. In an electric arc furnace of the type having an electrode housing and a crucible aligned therewith with the electrode housing including an elongated cylindrical metal member having means for the connection thereof to a source of electrical power; means for movably supporting an electrode in said cylindrical member with said electrode extending longitudinally of said cylindrical member, means for moving the electrode supporting means longitudinally of said cylindrical member, and means for providing an electrical connection between said cylindrical member and an electrode carried by said supporting means comprising a plurality of electrical conductors arranged angularly about the longitudinal axis of the cylindrical member, each of the conductors including a set of resilient metal leaves in overlying stacked engagement and extending generally chordally of and within said cylindrical member, means mounting the leaves for movement with the electrode supporting means with the leaves extending in opposite directions in cantilever fashion and with the unsupported portions of each leaf being in sliding contact with the next adjacent leaves during simultaneous flexure of the leaves, and a pair of shoe contacts engageable in sliding electrical contact with the inner surface of the cylindrical member carried by said set of leaves at the free ends respectively thereof and each including means engageable with the radially outermost leaf of the set adjacent the free end thereof during movement of the contact radially inwardly of the cylindrical member so as to simultaneously flex all of the leaves in the set.

4. In an electric arc furnace of the type having an electrode housing and a crucible aligned therewith with the electrode housing including an elongated cylindrical metal member having means for the connection thereof to a source of electrical power; means for movably supporting an electrode in said cylindrical member with said electrode extending longitudinally of said cylindrical member, means for moving the electrode surporting means longitudinally of said cylindrical member, and means for providing an electrical connection between said cylindrical member and an electrode carried by said supporting means comprising a plurality of sets of resilient metal leaves arranged angularly about the axis of the cylindrical member, each of said sets including a plurality of flat generally rectangular resilient metal leaves disposed in stacked overlying engagement and extending generally chordally of said cylindrical member, means mounting each set for movement with the electrode supporting means and with the leaves in each set extending in opposite directions in cantilever fashion and with the unsupported portions of each leaf being in sliding contact with the next adjacent leaves during simultaneous flexure of the leaves, and a pair of shoe type contacts engageable in sliding electrical contact with the inner surface of the cylindrical member and carried by the radially innermost leaf of each set thereof, each shoe contact having means engaged with the radially outermost leaf of the set adjacent the free end thereof.

5. In combination with an electric arc furnace of the type including an elongated metal cylinder having means for connecting the same to a source of electrical power, an electrode supporting means within the cylinder movable relative thereto; a current collector disposed entirely within the cylinder and mounted for movement with the electrode supporting means and comprising a spider carried by the supporting means and having a plurality of arms extending generally radially of the cylinder, and a set of flat resilient metal conductors carried by each of the spider arms with each of the conductors in each set extending in opposite directions from and generally at right angles to the respective spider arm, said conductors further extending generally chordally of the cylinder with the general plane thereof extending parallel to the longitudinal axis of the cylinder, the conductors in each set thereof being arranged in stacked overlying engagement with their unsupported end portions in sliding engagement with next adjacent conductors so that flexure of the radially outermost conductor radially inwardly of said cylinder will result in simultaneous flexure of the other conductors in the set, and a pair of electrical contacts engageable with the inner surface of said cylinder carried by the radially innermost conductor in each set at the opposite ends respectively thereof and in spaced relation to the terminal ends of the remaining conductors in the set, each contact having a shoulder engageable with the end portion of the radially outermost conductor during movement of the contact radially inwardly of the spider.

No references cited.